United States Patent [19]
Koide

[11] Patent Number: 6,157,482
[45] Date of Patent: Dec. 5, 2000

[54] BINOCULARS CAPABLE OF QUICKLY MOVING LENS COVERS TO A RETRACTED POSITION WHEN IN USE

[75] Inventor: Wataru Koide, Hachioji, Japan

[73] Assignee: Olympus Optical Co., Ltd., Tokyo, Japan

[21] Appl. No.: 09/465,345

[22] Filed: Dec. 16, 1999

[30] Foreign Application Priority Data

Jan. 8, 1999 [JP] Japan .................................. 11-002784

[51] Int. Cl.$^7$ .................................................. G02B 23/00
[52] U.S. Cl. ......................... 359/408; 359/412; 359/511
[58] Field of Search ..................... 359/407, 408, 359/412, 413, 415, 507, 511, 600, 611, 612

[56] References Cited

U.S. PATENT DOCUMENTS

| | | | |
|---|---|---|---|
| 4,641,932 | 2/1987 | Harms | 359/511 |
| 5,223,973 | 6/1993 | Ratzlaff | 359/409 |
| 5,631,772 | 5/1997 | Mizukawa | 359/511 |
| 5,784,195 | 7/1998 | MacCollum | 359/511 |

FOREIGN PATENT DOCUMENTS 6-68021  9/1994  Japan .

*Primary Examiner*—Darren Schuberg
*Assistant Examiner*—Mark A. Robinson
*Attorney, Agent, or Firm*—Frishauf, Holtz, Goodman, Langer & Chick, P.C.

[57] ABSTRACT

Binoculars has a pair of body units, lens cover members and lens cover member control mechanism. The body units have a lens each and are relatively movable between a first position in which the body units are not used and a second position in which the body units are used. The lens cover members are movable, at the fronts of the body units, between a protective position in which the respective lenses are not exposed to an outside and a retracted position in which the respective lenses are exposed to the outside. The lens cover member control mechanism latches the lens cover member to the protective position when the units bodies are set to a first position in which they are not used and releases the latching of the lens cover members in interlock with the movement of the body units from the first position to the second position and, by doing so, moves the lens cover members to the retracted position.

18 Claims, 9 Drawing Sheets

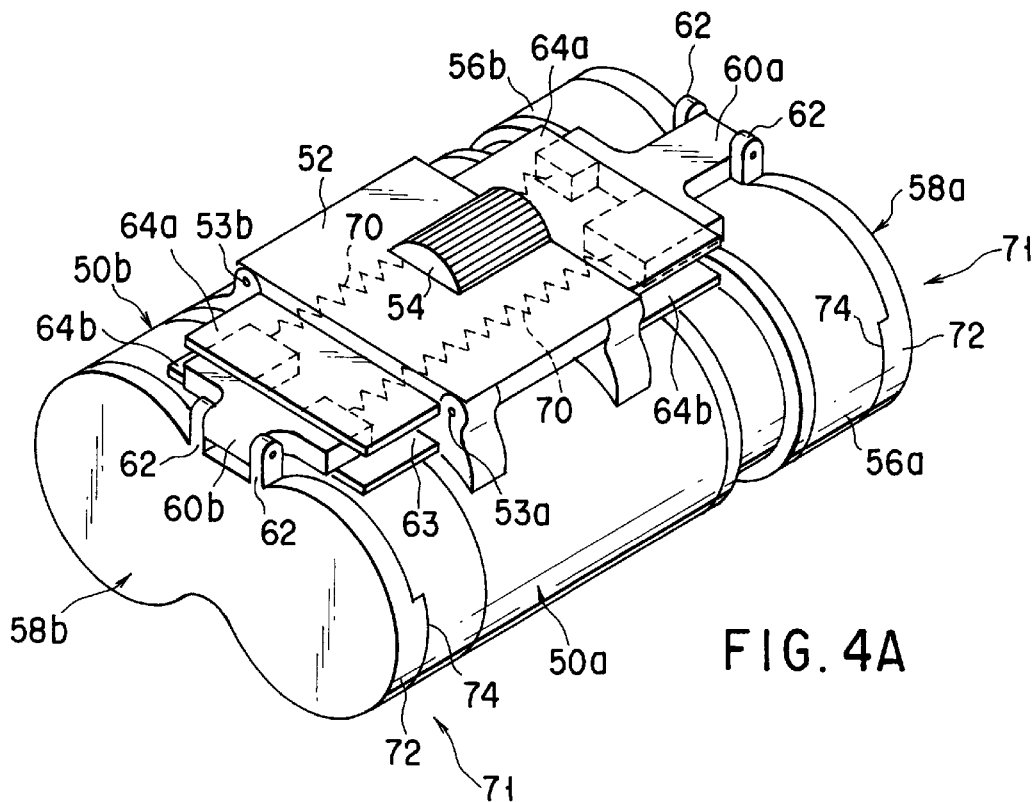
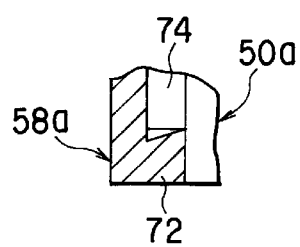 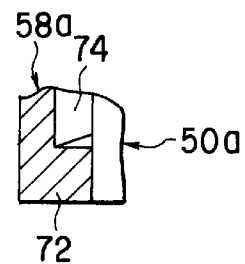
FIG. 4B    FIG. 4C
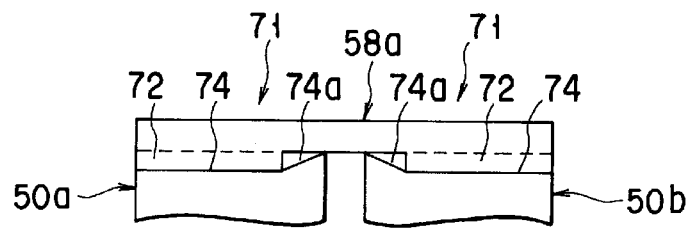
FIG. 4D

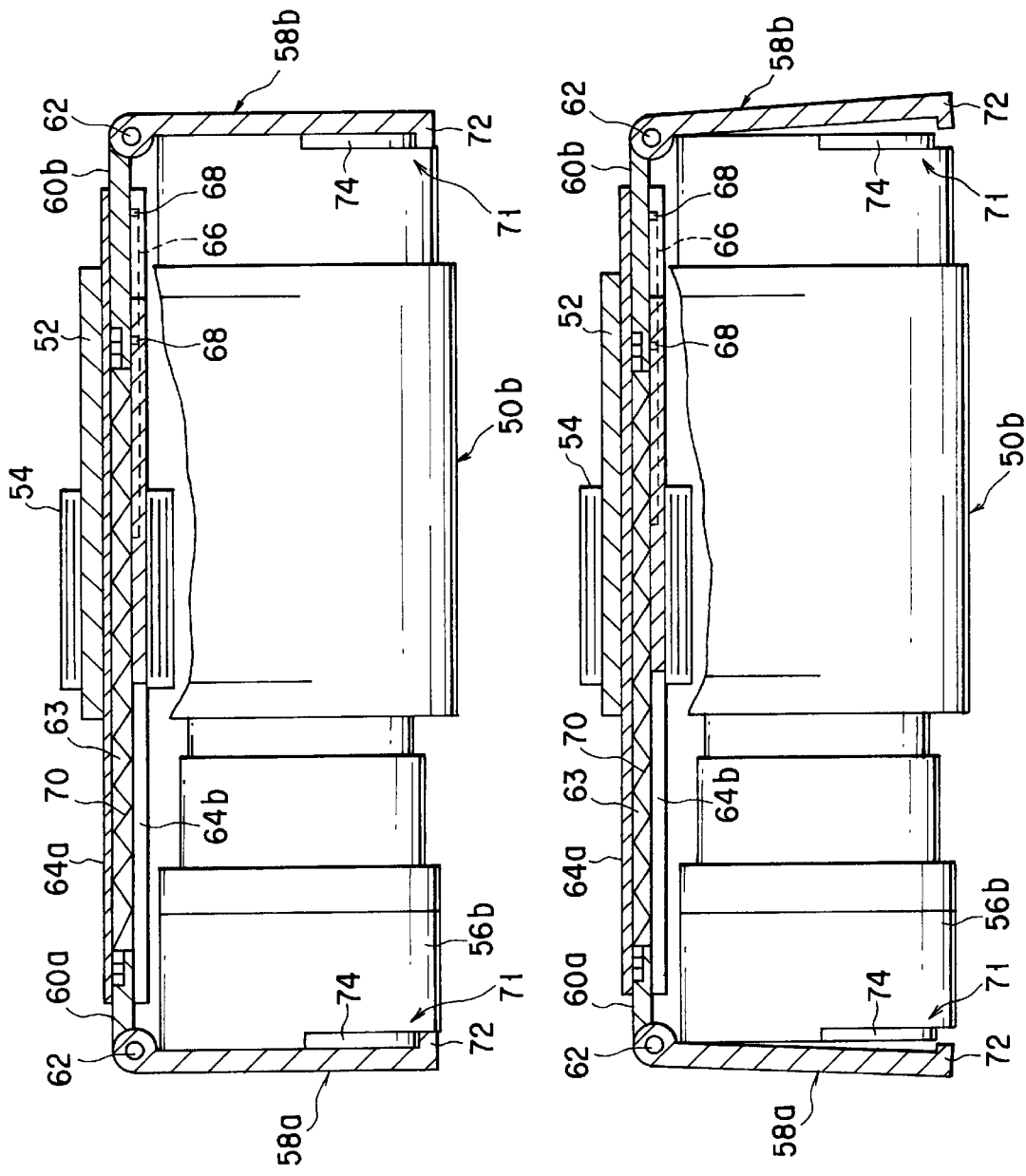

BINOCULARS CAPABLE OF QUICKLY MOVING LENS COVERS TO A RETRACTED POSITION WHEN IN USE

BACKGROUND OF THE INVENTION

The present invention relates to binoculars and, in particular, to binoculars capable of relatively changing the positions of a pair of lens-equipped body units and having, at the fronts of the body units, lens covers for covering lenses exposed to an outside.

As well known in this field of art, it is recommended that, when the binoculars are not in use, exposed lenses at both ends of the binoculars be covered with associated lens covers.

This is so done in view of a possibility that, otherwise, dirt and dust will be deposited on the lenses at both the ends of a pair of body units and that the lenses will be injured due to the contacting of some foreign matter with the lenses.

Jpn. UM Appln. KOKAI Publication No. 6-68021 discloses the conventional technique relating to the binoculars equipped with lens covers.

The lens covers disclosed in the Jpn. UM Appln. KOKAI Publication No. 6-68021 are manually movable, at both the ends of the binoculars, between a lens protective position (not-used state) and a retracted position (usable state) in which the lenses are exposed.

In this binoculars, the lens covers have to be manually moved from the protective position to the retracted position and, when the binoculars have to be used quickly and abruptly, it takes long to remove the lens covers from both the ends of a pair of body units.

BRIEF SUMMARY OF THE INVENTION

The present invention has been achieved with the above in view and the object of the present invention is to provide binoculars which, when it has to be used quickly and abruptly, can move the lens coves from a protective position in which respective lenses are covered on both the ends of a pair of body units onto a retracted position easily and speedily.

In order to achieve the above-mentioned object, there is provided binoculars according to one embodiment of the present invention, comprising:

a pair of body units having a lens, respectively, and relatively movable between a first position in which the body units are not used and a second position in which the body units are usable;

lens cover members so provided as to be movable between a protective position in which, at the fronts of the body units, the lens is not exposed to an outside and a retracted position in which, at the fronts of the body units, the lens is exposed to the outside; and a lens cover member control mechanism which, when the body units are set to the not-used state corresponding to the first position, latches the lens cover members to the protective position and, when the body units are moved from the first position to the usable position corresponding to the second position, releases the latching of the lens cover members in interlock with the movement of the body units to move the lens cover members to the retracted position.

In order to achieve the above-mentioned object, there is provided binoculars according to another embodiment of the present invention which is capable of relatively changing positions of a pair of body units having a lens, respectively, the binoculars comprising:

lens covers movable between a protective position in which, at the fronts of the body units, the lens covers protect the lens exposed to an outside and a retracted position in which the lens covers are retracted from the fronts of the body units; and cover control means for, when the body units are set to a first position, latching the lens covers to the protective position and, when the body units are moved from the first position to a second position, releasing the latching of the lens covers in interlock with this movement to move the lens covers to the retracted position.

In order to achieve the above-mentioned object, there is provided binoculars according to a still another embodiment of the present invention, comprising:

one pair of body units so connected as to be relatively movable;

a lens cover movable between a protective position for covering lenses at least one end of the body units and a retracted position moved from the protective position and exposing the lenses at at least one end of the body units; and lens cover retaining means for, when the body units are set to a predetermined not-used position, retaining the lens cover in the protective position and, by a movement of the body units from the predetermined not-used position, allowing a movement of the lens cover from the protective position to the retracted position.

In the thus structured binoculars of the present invention, when the binoculars is in a not-used position and hence the body units are in the first position, the lens cover member control mechanism latches the lens cover members to the protective position to protect the lenses at the fronts of the body units from any deposition of dirt and dust and from an injury.

And when the binoculars are to be used, the body units are moved from the first position to the second position.

Then in interlock with this movement the lens cover member control mechanism releases the latching of the leans cover to move the lens cover members to the retracted position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is an upper front perspective view diagrammatically showing binoculars according to a second embodiment of the present invention, the binoculars showing a not-used state;

FIG. 4B shows a partial, vertical cross-section showing one practical form of a latching means in the binoculars according to the second embodiment of the present invention;

FIG. 4C shows a partial, vertical cross-section of another practical form of the latching means of the binoculars according to the second embodiment of the present invention;

FIG. 4D is a partial, lower view showing a latch releasing means of the binoculars according to the second embodiment of the present invention;

FIG. 6 is a vertical, cross-sectional view, partly cut away, diagrammatically showing the binoculars shown in FIG. 5A;

FIG. 8 is a vertical cross-sectional view diagrammatically showing the binoculars of FIG. 7A;

DETAILED DESCRIPTION OF THE INVENTION

Figure 1:
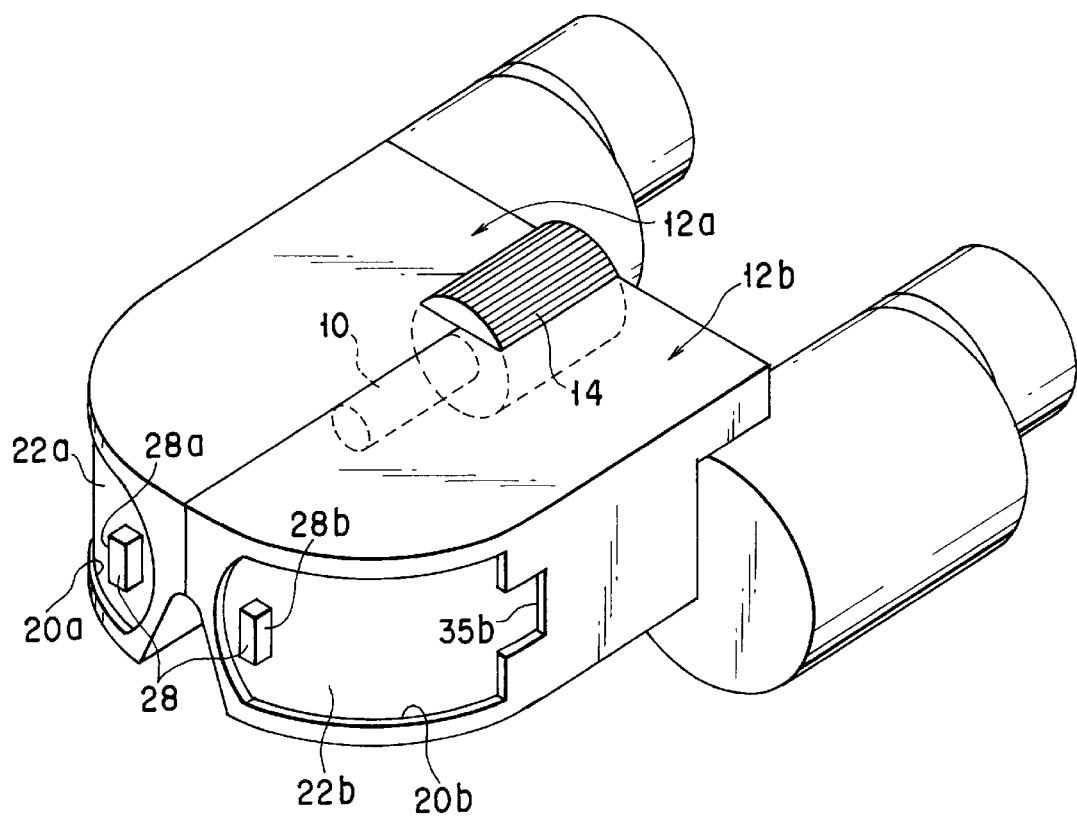
FIG. 1 is an upper front perspective view diagrammatically showing binoculars according to a first embodiment of the present invention, the binoculars being shown in a not-used position.

Reference will now be made in detail to the presently preferred embodiments of the invention as illustrated in the accompanying drawings, in which like reference numerals designate like or corresponding parts.

With reference to the drawings, an explanation will be made about various embodiments of the present invention.
(First Embodiment)

A structure of binoculars according to a first embodiment of the present invention will be explained below by referring to FIGS. 1 and 2A, 2B.

Here, FIG. 1 is a front, upper, perspective view diagrammatically showing the binoculars, in a not-used state, according to the first embodiment of the present invention.

Figure 2A:
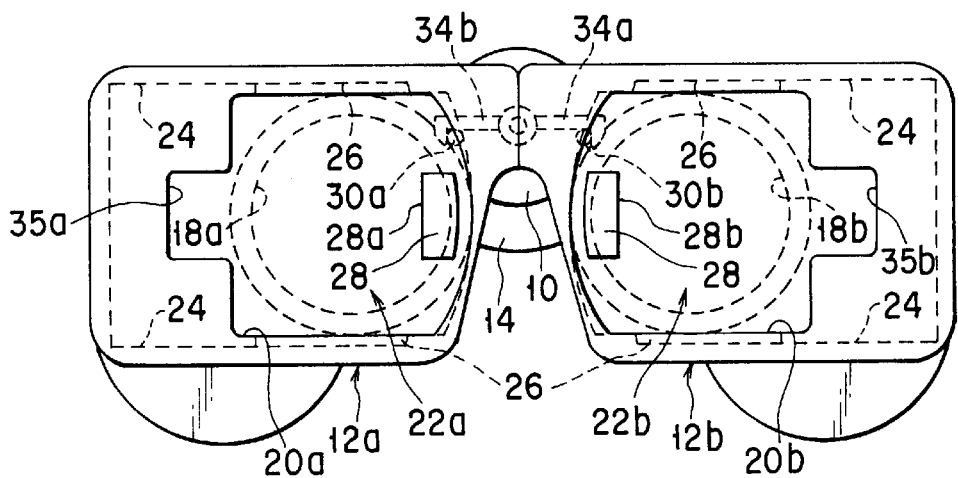
FIG. 2A is a front view diagrammatically showing the binoculars shown in FIG. 1.

FIG. 2A is a front view diagrammatically showing the binoculars shown in FIG. 1.

Figure 2B:
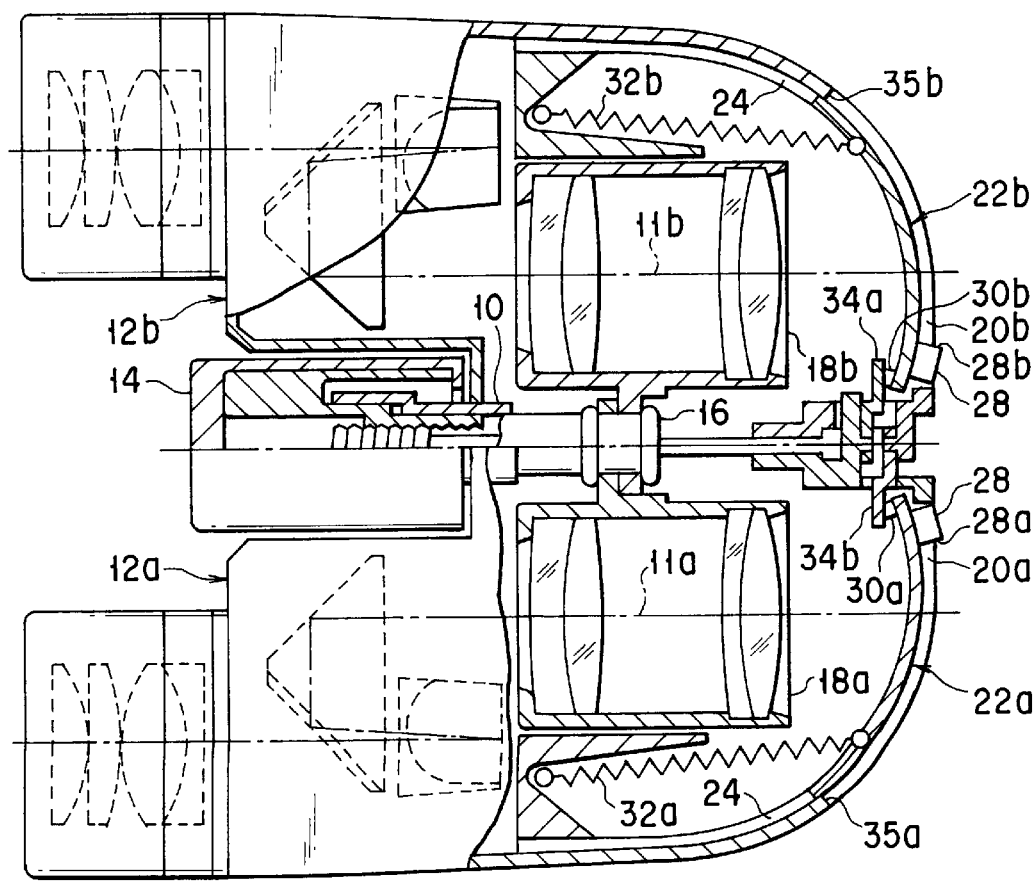
FIG. 2B is a plan view, partly cut away, diagrammatically showing the binoculars shown in FIG. 1.

FIG. 2B is a plan view, partly cut away, showing the binoculars shown in FIG. 1.

The binoculars of the first embodiment of the present invention includes a pair of body units 12a, 12b arranged mutually parallel to each other as shown in FIG. 1, that is, arranged one at each side of a center shaft 10.

These body units 12a, 12b are swingable around the center shaft 10.

As shown in FIG. 2B, a focusing drive rod 16 is connected to the center shaft 10 at a location of a rotatably mounted center focusing ring 14.

The focusing drive rod 16 advances or retracts by rotating the central focusing ring 14 in one or the other direction.

Objective lens groups 18a and 18b in the body units 12a and 12b are coupled to the focusing drive rod 16 through the body units 12a and 12b, respectively.

The arrangement thus for explained above are the same as that of the conventional binoculars.

In the body units 12a and 12b, openings 20a and 20b are provided on extensions of optical axes 11a and 11b of the objective lens groups 18a, 18b, respectively.

Lens covers 22a and 22b are provided relative to the openings 20a and 20b.

These lens covers 22a and 22b are set in a protective position in which the openings 20a and 20b are blocked.

The lens covers 22a and 22b, being in the protective state, protect the objective lens groups 18a and 18b inside the openings 20a and 20b from the deposition of dirt and dust thereon and from an injury caused by a load coming from an external force.

By moving the lens covers 22a and 22b from the protective position along the openings 20a and 20b toward external left and right sides, these lens covers are movable away from the openings 20a and 20b to a retracted position.

A pair of horizontal grooves 24 are formed at the upper and lower portions of the openings 20a and 20b and extend in a direction horizontal to each other.

As shown in FIG. 2A, a pair of engaging projections 26 extend in a substantially vertical direction from the upper and lower edges of the lens covers and are inserted into the corresponding pair of horizontal grooves 24.

By a combination of the upper and lower grooves 24 of the openings 20a, 20b with the upper and lower engaging projections 26, the lens covers 22a, 22b are so guided as to be moved between the above-mentioned protective position and the above-mentioned retracted position.

Finger engaging projections 28 are provided on the external surfaces of mutually adjacent ends of the lens covers 22a and 22b.

Latching projections 30a, 30b are provided on the inner surfaces of the mutually adjacent ends of the lens covers 22a and 22b.

Urging means 32a, 32b, such as coil springs, are present between the lens covers 22a, 22b and the inner surfaces of the body units 12a, 12b, respectively.

In this embodiment, the urging means 32a, 32b are constituted by coil springs.

The urging means 32a, 32b urge the lens covers 22a, 22b toward the above-mentioned retracted position.

As a result, the urging means 32a, 32b of the present embodiment constitute a lens cover drive mechanism for driving the lens covers 22a, 22b from the above-mentioned protective position toward the above-mentioned retracted position.

A latching claw 34a is provided on one 12a of the body units 12a, 12b and projected into the other body units 12b.

A latching claw 34b is provided on the above-mentioned other body unit 12b and projected into the opposite body unit 12a.

The base ends of these latching claws 34a, 34b are swingable in a predetermined range relative to the mounted body unit 12a or 12b.

That is, the base ends of the latching claws 34a, 34b are swingable between a reference position shown in FIG. 2A and an upwardly swung position in which their forward ends are slightly swung upwardly from the reference position.

Here, the latching claws 34a, 34b are urged toward the reference position by an urging means not shown.

When the body units 12a, 12b are set to a predetermined "not used" position (first position) as shown in FIGS. 1 and 2A, 2B, the forward ends of the latching claws 34a, 34b in the above-mentioned reference position are latched to the corresponding latching projections 30a, 30b of the lens covers 22a, 22b in the protective position.

As a result, the lens covers 22a, 22b are retained to the protective position against urging forces of the urging means 32a, 32b.

That is, the latching claws 34a, 34b of the body units 12a, 12b and latching projections 30a, 30b of the lens covers 22a, 22b co-act to provide a latching mechanism for latching the lens covers 22a, 22b to the above-mentioned protective position.

Figure 3A:
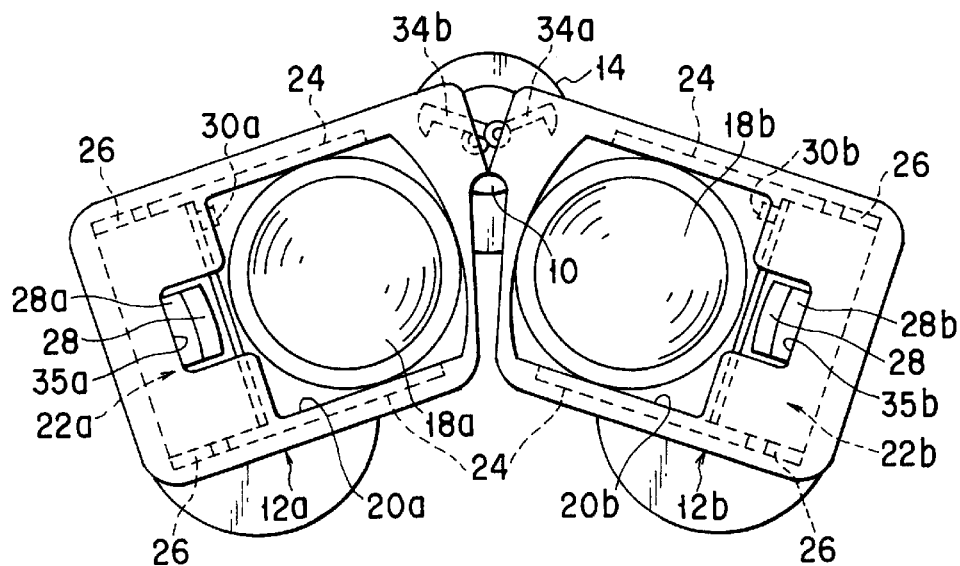
FIG. 3A is a front view diagrammatically showing a usable state of the binoculars according to the first embodiment of the present invention.
Figure 3B:
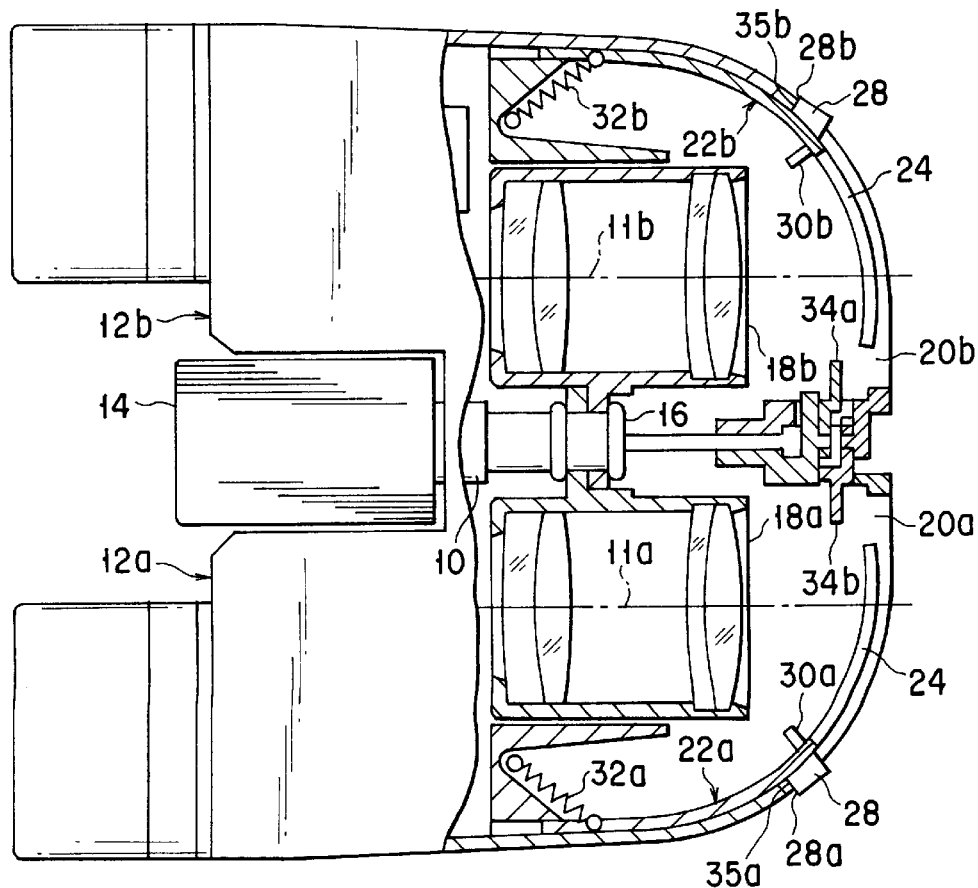
FIG. 3B is a plan view, partly cut away, diagrammatically showing the binoculars of FIG. 3A.

With reference to FIGS. 3A and 3B, an explanation will be made about the function of the so arranged binoculars according to the first embodiment of the present invention.

Here, FIG. 3A is a front view diagrammatically showing a usable state of the binoculars of the above-mentioned first embodiment.

FIG. 3B is a plan view, partly cut away, diagrammatically showing the binoculars of FIG. 3A.

When the above-mentioned binoculars is used, the body units 12a, 12b are swung around the center shaft 10 from the predetermined "not-used" position (first position) shown in FIGS. 1 and 2A, 2B down toward the "usable" position (second position).

Then, as shown in FIG. 3A, the forward ends of the latching claws 34a, 34b are moved upwardly away from the center shaft 10.

The forward ends of the latching claws 34a, 34b are unlatched from the corresponding latching projections 30a, 30b of the lens covers 22a, 22b.

As a result, the lens covers 22a, 22b are moved, under the urging forces of the urging means 32a, 32b from the protective position as shown in FIGS. 1 and 2A, 2B toward the retracted position as shown in FIGS. 3A, 3B.

The movement of the lens covers 22a, 22b to the retracted positions is stopped by abutting the left and right outer ends 28a, 28b of the respective finger engaging projections 28 of the lens covers 22a, 22b against corresponding left and right outer end edges of the openings 20a, 20b of the body units 12a, 12b.

The lens covers 22a, 22b thus stopped to the retracted positions uncover the openings 20a, 20b to expose the objective lens groups 18a, 18b to an outside through the openings 20a, 20b.

In this embodiment, when the binoculars is used, the user can move the lens covers 22a, 22b from the protective position to the retracted position simply by swinging the body units 12a, 12b from the above-mentioned predetermined position (first position) to the usable position (second position).

Further, since the movement of the lens covers 22a, 22b is quickly effected under the urging force of the urging means 32a, 32b, it is possible to quickly set the binoculars from the "not used" position to the "usable" position.

Further, the lens covers 22a, 22b are supported by the body units 12a, 12b not only in the protective position but also during the movement between the protective position and the retracted position and, hence, these lens covers are never dropped, or separated, from the body units 12a, 12b.

Therefore, there occurs no missing of the lens covers in spite of the fact that they are moved quickly from the protective position to the retracted position.

And in the case where the binoculars is not used for a longer period of time, such as it is conserved or carried about, the user rotates the body units 12a, 12b around the center shaft 10 from the usable position (second position) as shown in FIGS. 3A, 3B to the "not used" position (first position).

After the body units 12a, 12b have been returned to the predetermined "not used" position (first position) as shown in FIGS. 1 and 2A, 2B, the user returns the lens covers 22a, 22b from the above-mentioned retracted position back to the protective position as shown in FIGS. 1 and 2A, 2B by a manual operation against the urging forces of the urging means 32a, 32b with his or her finger put on the finger engaging projections.

At this time, the lens covers 22a, 22b just before being brought to the protective position enables their latching projections 30a, 30b to push the forward ends of the latching claws 34a, 34b, that is, the latching claws set to the above-mentioned reference position, upwardly against the urging forces of the urging means not shown in the body units 12a, 12b.

By doing so, the lens covers 22a, 22b pass below the forward ends of the latching claws 34a, 34b which are pushed upwardly by the latching projections 30a, 30b.

And after the passage of the lens covers 22a, 22b the latching claws 34a, 34b are latched to the latching projections 30a, 30b of the lens covers 22a, 22b brought to the protective positions, by the forward ends returned back to the reference position.

So long as the body units 12a, 12b are set to the predetermined "not-used" position (first position) as shown in FIGS. 1 and 2A, 2B, the lens covers 22a, 22b are retained to the protective position against the urging forces of the urging means 32a, 32b.

As obvious from the above-mentioned explanation, according to the embodiment, the latching claws 34a, 34b of the body units 12a, 12b, latching projections 30a, 30b of the lens covers 22a, 22b, and urging means 32a, 32b constitute a lens cover member control mechanism.

And such a lens cover member control mechanism latch the lens covers 22a, 22b to the protective position when the body units 12a, 12b are set to the predetermined "not used" position (first position).

When the body units 12a, 12b are moved from the above-mentioned "not used" position (first position) to the "usable" position (second position) as shown in FIGS. 3A, 3B which is different from the "not used" position (first position), the lens cover member control mechanism performs a latch releasing operation in interlock with this movement to move the lens covers 22a, 22b to the retracted position.

In the lens cover member control mechanism, a latching mechanism for latching the lens covers 22a, 22b to the protective position when the body units 12a, 12b are set to the "not-used" position (first position) comprises a combination of the latching claws 34a, 34b of the body units 12a, 12b and latching projections 30a, 30b of the lens covers 22a, 22b.

The lens cover member drive mechanism for moving the lens covers 22a, 22b to the retracted position in the case where the above-mentioned latch is released in interlock with the movement of the body units 12a, 12b from the "not used" position (first position) to the usable position (second position) is comprised of the urging means 32a, 32b.

(Second Embodiment)

With reference to FIGS. 4A to 4D, 5A and 5B and 6, an explanation will be made about the structure of binoculars according to a second embodiment of the present invention.

Here, FIG. 4A is a front, upper perspective view diagrammatically showing a structure of the binoculars according to the second embodiment, the binoculars being shown in a "not-used" state.

FIGS. 4B and 4C are partial, vertical cross-sectional views showing two practical forms of a latching mechanism according to the above-mentioned second embodiment.

FIG. 4D are a partial, lower view showing a latch releasing mechanism according to the second embodiment.

Figure 5A:
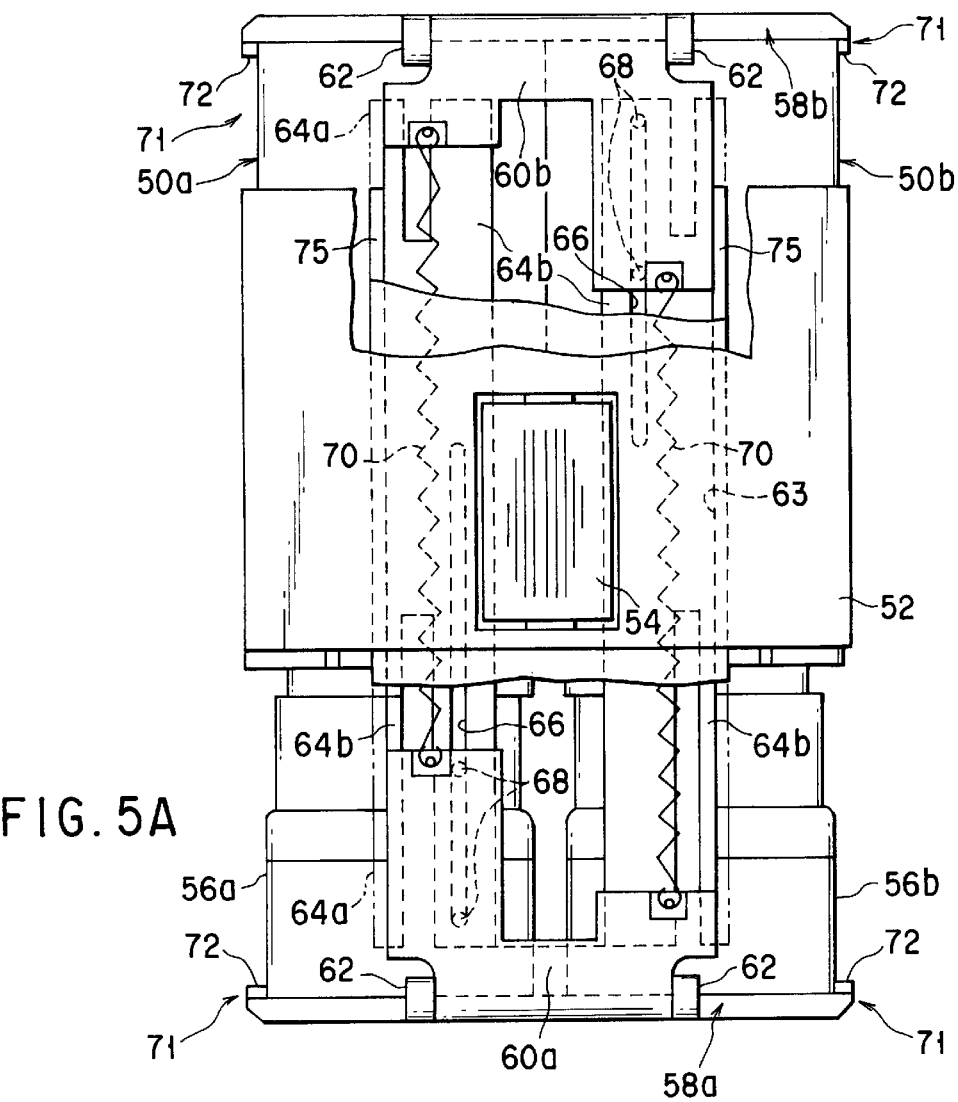
FIG. 5A is a plan view diagrammatically showing the binoculars according to the second embodiment of the present invention, the binoculars showing a not-used state.

FIG. 5A is a plan view diagrammatically showing the binoculars according to the second embodiment, the binoculars being shown in the "not-used" state.

Figure 5B:
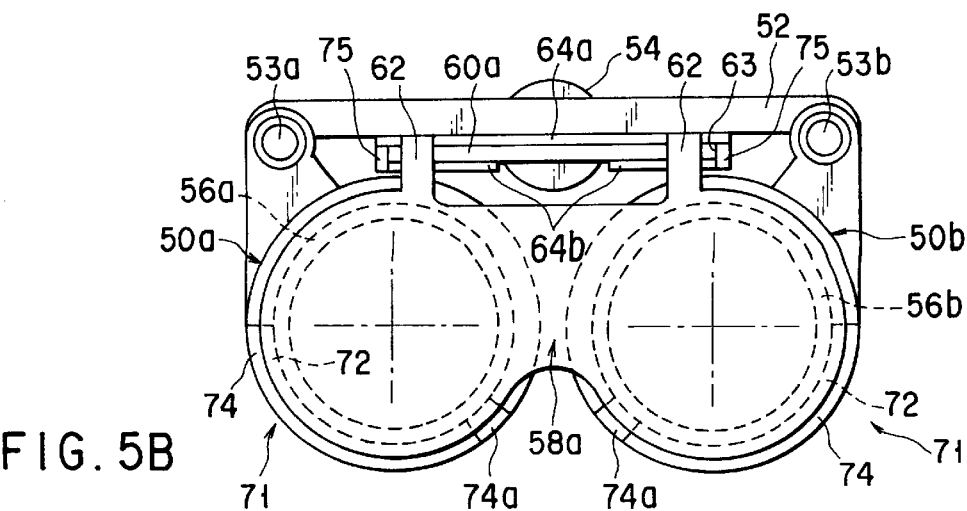
FIG. 5B is a front view diagrammatically showing the binoculars shown in FIG. 5A.

FIG. 5B is a front view diagrammatically showing binoculars shown in FIG. 5A;

FIG. 6 is a side view, partly cut away, diagrammatically showing the binoculars shown in FIG. 5A;

As shown in FIGS. 4A and 5A, 5B, the binoculars according to the second embodiment of the present invention has one pair of body units 50a, 50b arranged horizontal to each other.

A bridge-like section 52 is situated flat over the body units 50a, 50b.

The body units 50a, 50b are connected to the bridge-like section 52 through rotation center shafts 53a, 53b.

A central focusing ring 54 is arranged at the middle of the bridge-like section 52.

Eyepiece lens sleeves 56a, 56b are arranged at one end side of the body units 50a, 50b.

The rotation of the central focusing ring 54 in one and the other direction advances and retracts the eyepiece lens sleeves 56a, 56b.

These eyepiece lens sleeves 56a, 56b constitute an eyepiece lens section for the body units 50a, 50b.

The other-end side of the body units 50a, 50b provides an objective lens section.

The arrangement thus far explained is the same as that of the conventional binoculars.

In FIGS. 4A and 5A, 5B, the body units 50a, 50b are arranged in a predetermined "not-used" position (first position) relative to the bridge-like section 52.

The fronts of the body units 50a, 50b at both ends are covered with the lens covers 58a and 58b.

By doing so, the lens covers 58a, 58b prevent dirt and dust being deposited on the front faces of the body units 50a, 50b at both ends and an injury being made due to a load coming from an external force.

At this time, the lens covers 58a, 58b are set in a protective position.

Further, moving plates 60a, 60b are situated flat over both end portions of the body units 50a, 50b.

The upper end portions of the lens covers 58a, 58b in the protective position are connected to the outer end portions of the moving plates 60a, 60b respectively through a pivoting means 62.

The inner end portions of the moving plates 60a, 60b are inserted in moving guide grooves 63 formed in a clearance between the bridge-like section 52 and the upper portions of the outer peripheral surface of the body units 50a, 50b.

A pair of moving guide plates 64a, 64b extend, as a pair of mutually parallel upper and lower guide plates, along the upper portions of the outer peripheral surfaces of the body units 50a, 50b.

The inner end portions of the moving guide plates 60a, 60b are inserted into a clearance between the moving guide plate 64a and 64b.

A pair of side guide members 75 are fixed at both left and right ends of the above-mentioned clearance and extend along the left and right edges of the moving guide plates 64a, 64b.

The moving guide groove 63 is constituted by a clearance defined by the moving guide plates 64a, 64b and pair of side guide members 65.

Moving guide recesses 66 are provided at the lower moving guide plate 64b and extend along a direction of optical axes of the body units 50a, 50b.

On the lower surfaces of the moving plates 60a, 60b a plurality of moving guide projections 68 are so provided as to be mutually spaced apart along the direction of the optical axes.

The moving guide projections 68, being inserted in the moving guide recesses 66, restrict the moving direction of the moving plates 60a, 60b in the moving guide grooves 63.

One pair of urging means 70, 70 are so provided as to extend between the moving plates 60a and 60b in the moving guide grooves 63.

Both the ends of these urging means 70, 70 are connected to the moving plates 60a and 60b.

The energizing means 70, 70 are so urged as to be mutually moved toward each other.

By mutually moving the moving plates 60a, 60b toward each other, the lens covers 58a, 58b connected through a pivoting means 62 to the moving plates 60a, 60b spring open from the protective positions at both ends of the body units onto an upper retracted positions and moved closer to each other in a way to follow the moving plates 60a, 60b.

That is, in this embodiment, the urging means 70, 70 constitute a cover drive means for moving the lens covers 58a, 58b from the above-mentioned protective position toward the retracted position.

And in this embodiment the urging means 70, 70 are comprised of a tension coil spring.

A plurality of latching mechanisms 71 are present between the lens covers 58a, 58b on one hand and both the ends of the body units 50a, 50b on the other.

The latching mechanisms 71 are of such a type that, during the period in which the body units 50a, 50b are set to the predetermined "not used" position, that is, the first position, the lens covers 58a, 58b are latched to the protective positions at both ends of the body units 50a, 50b against the urging force of the urging means 70, 70.

Here, the latching mechanism 71 includes a plurality of latching projections 72 extending in a circular arc-like way along the inner edges of the inner surfaces of the lens covers 58a, 58b and a plurality of latching recesses 74 of a circular arc configuration provided at the fronts of both the ends of the body units 50a, 50b.

And when the body units 50a, 50b are set to the above-mentioned predetermined "not-used" position (first position) the latching projections 72 of the lens covers 58a, 58b in the above-mentioned protective position are latched to the latching recesses 74 of both the ends of the body units 50a, 50b.

Further, either one of the inner wall surface of the latching projection 72 and the outer peripheral surface of the latching recess 74 has an inclined surface as shown in a vertical cross-section in FIGS. 4B and 4C.

This prevents any ready release of the latching projection 72 of the lens covers 58a, 58b to the latching recess 74 of both ends of the body units 50a, 50b by an urging force transmitted from the urging means 70, 70 through the moving plates 60a, 60b to the lens covers 58a, 58b.

The mutually neighboring ends of the latching recesses 74 at both the ends of the body units 50a, 50b are formed as inclined surfaces 74a as shown in FIG. 4D.

These inclined surfaces 74a are so inclined as to be moved forward upon being moved toward each other.

The lens covers 58a, 58b are made of an elastic material including synthetic resin.

The lens covers 58a, 58b can be made of a hard material and the latching projection 72 only can be made of an elastic material.

Further, the lens covers 58a, 58b and latching projections 72 can be made of a hard material in which case the latching projection 72 alone can be formed as a thin-wall projection so as to provide an elastic property to it.

In the binoculars according to the second embodiment thus structured, during a period in which the body units 50a, 50b are set to the predetermined "not used" position (first position) as shown in FIGS. 4A and 5A, 5B, the latching projections 72 of the lens covers 58a, 58b in the protective position are latched to the latching recesses 74 at both the ends of the body units 50a, 50b as better shown in FIG. 4B or 4C.

And by a friction force generated by the latching the lens covers 58a, 58b are retained to the protective position, as shown in FIGS. 4A, 5A, 5B and 6, against the urging forces of the urging means 70, 70.

The lens covers 58a, 58b at the protective position prevent dirt and dust being deposited on a lens, not shown, exposed to the outside at the fronts of the body units 50a, 50b and prevent any damage caused to the exposed lens by a load coming from an external force.

This structure is suited to the case where the binoculars is set to the "not-used" state over a relatively long period such as it is stored or carried about by the user.

That is, this provides a latching mechanism 71 for latching the lens covers 58a, 58b to the above-mentioned protective position, and retaining it, through a mutual cooperation between the latching recesses 74 at both the ends of the body units 50a, 50b and the latching projections 72 of the lens covers 58a, 58b.

Now, with reference to FIGS. 7A, 7B, 8 to 11, an explanation will be given below about the operation of the binoculars according to the second embodiment of the present invention.

Figure 7A:
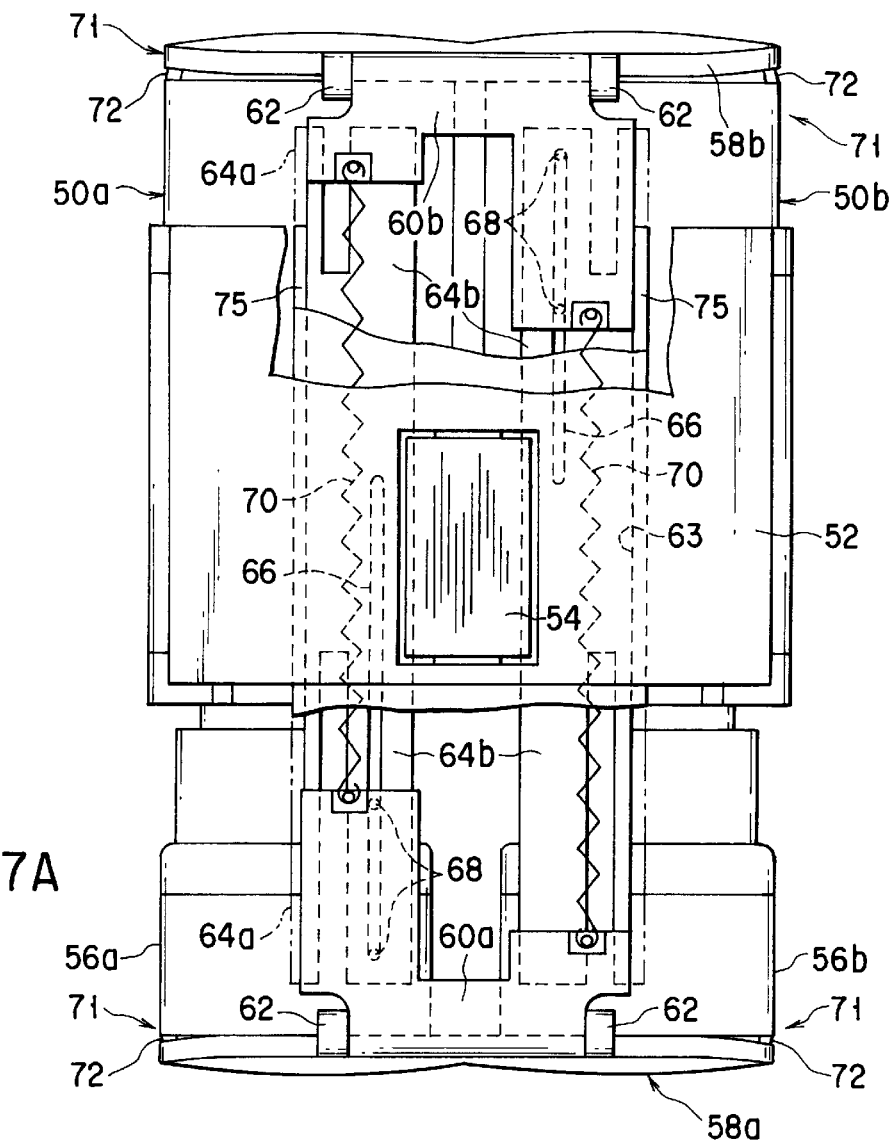
FIG. 7A is a plan view diagrammatically showing the binoculars according to the second embodiment of the present invention, the view showing a state immediately after the latching of the lens covers to both the ends of a pair of body units has been released by the latch releasing means shown in FIG. 4D.

Here, FIG. 7A is a plan view diagrammatically showing the binoculars according to the second embodiment of the present invention, the view showing a state immediately after the latching of the lens covers to both the ends of the body units is released by the latch releasing mechanism shown in FIG. 4D.

Figure 7B:
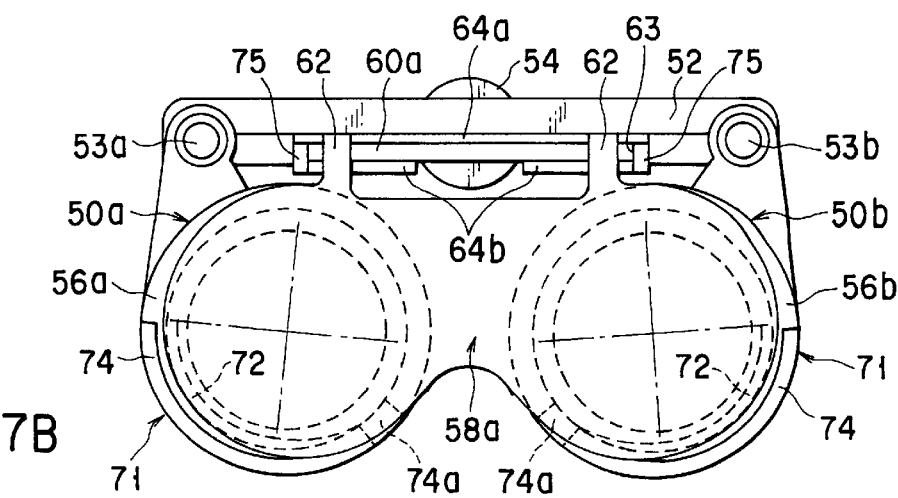
FIG. 7B is a front view diagrammatically showing the binoculars shown in FIG. 7A.

FIG. 7B is a front view diagrammatically showing the binoculars shown in FIG. 7A.

FIG. 8 is a side view, partly cut away, diagrammatically showing the binoculars shown in FIG. 7A.

Figure 9:
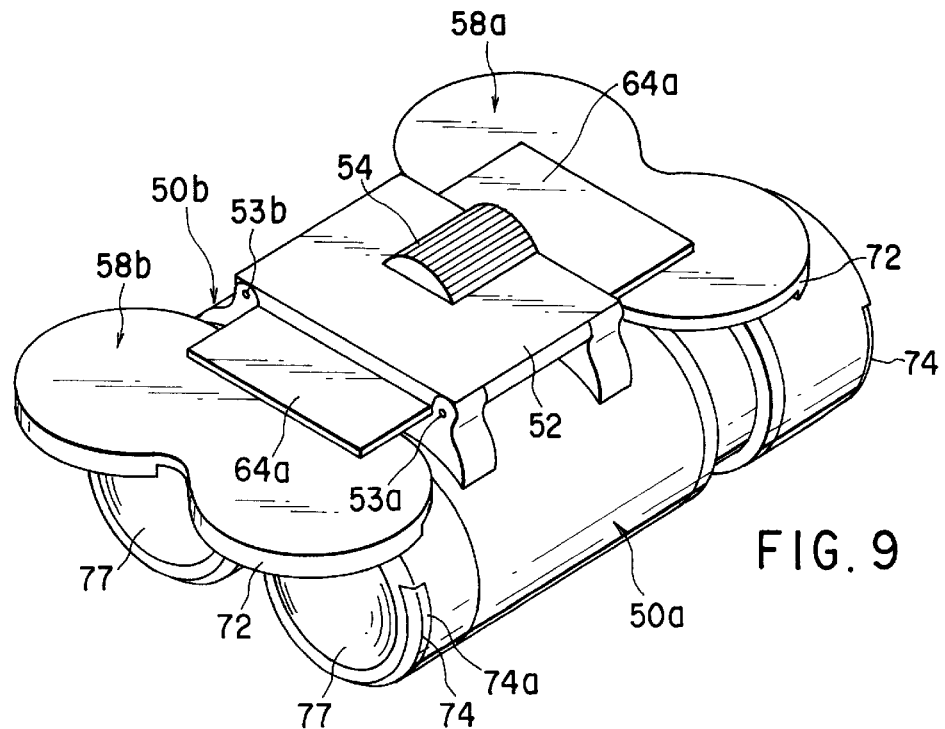
FIG. 9 is a perspective view diagrammatically showing the binoculars according to the second embodiment, the view showing a usable state in which the lens covers are set to a retracted position.

FIG. 9 is a perspective view diagrammatically showing the binoculars according to the second embodiment, the binoculars showing a usable state in which the lens covers are in a retracted position.

Figure 10A:
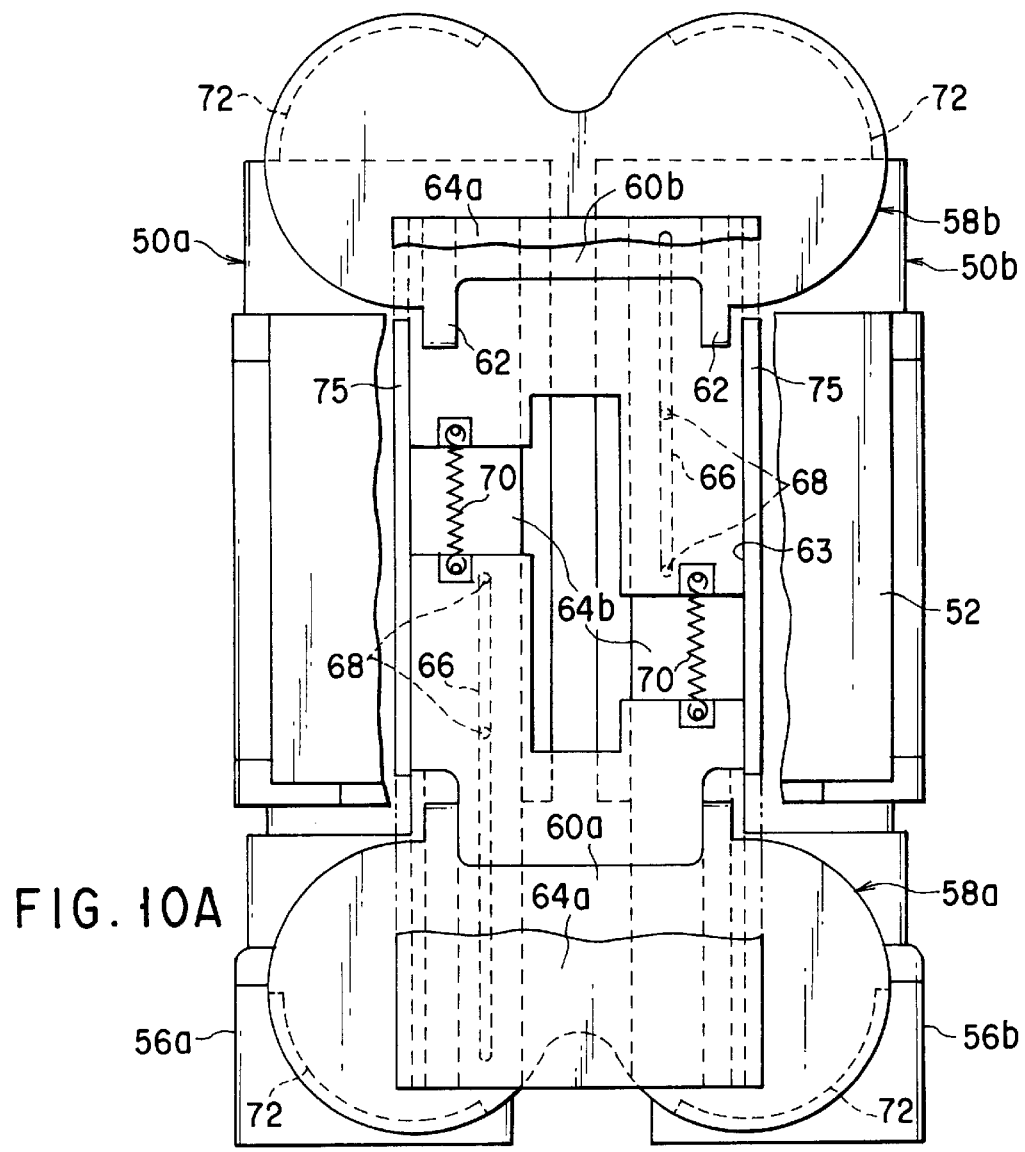
FIG. 10A is a plan view diagrammatically showing the binoculars shown in FIG. 9.

FIG. 10A is a plan view diagrammatically showing the binoculars shown in FIG. 9.

Figure 10B:
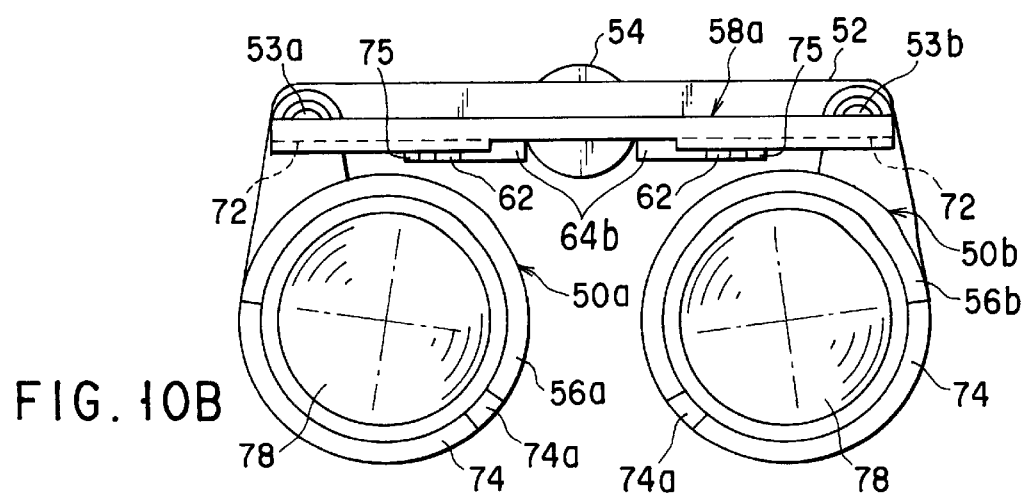
FIG. 10B is a cross-sectional view diagrammatically showing the binoculars shown in FIG. 9.

FIG. 10B is a front view diagrammatically showing the binoculars of FIG. 9.

Figure 11:
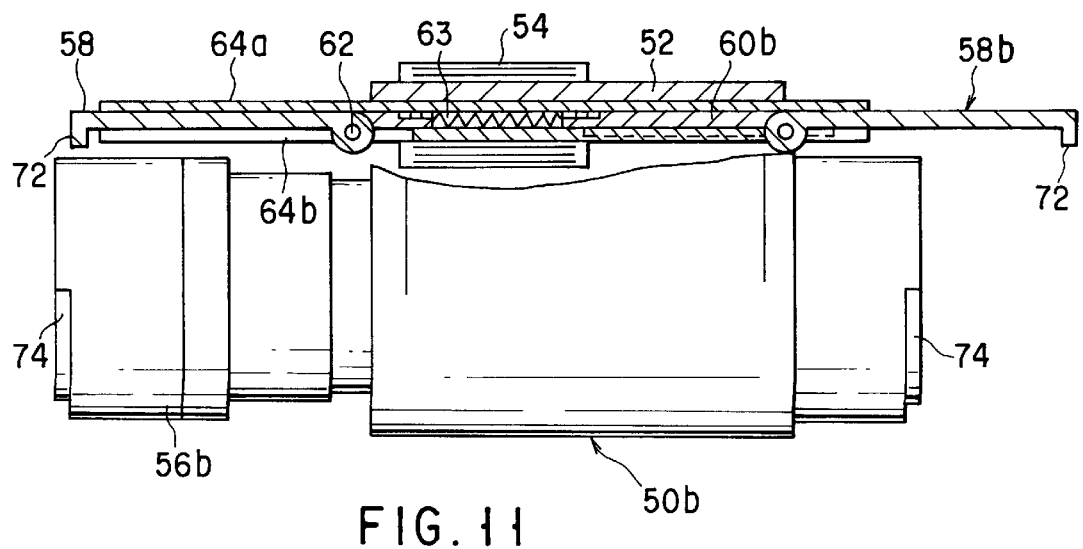
FIG. 11 is a side view, partly cut away, diagrammatically showing the binoculars shown in FIG. 9.

FIG. 11 is a side view, partly cut away, diagrammatically showing the binoculars of FIG. 9.

When the binoculars according to the second embodiment is used, the body units 50a, 50b are manually moved upwardly around the rotation center shafts 53a, 53b from the predetermined "not-used" position (first position) as shown in FIGS. 4A and 5A, 5B.

By this rotational movement, the body units 50a, 50b are moved away from each other to cause the inclined surfaces 74a (see FIG. 4D) of the latching recesses 74 on both the ends of the body units 50a, 50b to forwardly push out the corresponding latching projections 72 of the lens covers 58a, 58b.

Since this pushing-out of the latching projections 72 is effected forwardly and elastically, the latching projections are unlatched from the latching recesses 74.

As a result, as shown in FIGS. 7A, 7B and 8, the lens covers 58a, 58b are moved away from both the ends of the body units 50a, 50b and a clearance is created between the ends of the body units 50a, 50b.

The lens covers 58a, 58b are swung upwardly around the pivoting means 62, under the urging forces of the urging means 70, 70, away from the ends of the body units 50a, 50b toward an upper surface side, that is, a retracted position.

During this swinging motion, the moving plates 60a, 60b are retracted, under the urging forces of the urging means 70, 70, into the moving guide grooves 63 and moved toward each other.

And the upwardly swinging motion of the lens covers 58a, 58b is restricted by the upper moving guide plate 64a when the lens covers 58a, 58b are made horizontal to the moving guide groove 63.

The horizontal movement of the moving plates 60a, 60b in the moving guide grooves 63 together with the movement of the lens covers 58a, 58b is stopped when, as shown in FIG. 10A, one inner moving guide projection 68 of the moving plates 60a, 60b is abutted against the inner end of the moving guide recess 66 of the lower moving guide plate 64b.

At this time, the lens covers 58a, 58b are situated at the upper sides of both the end portion of the body units 50a, 50b in a direction horizontal to the optical axes of the body units 50a, 50b.

And the lens covers 58a, 58b are now situated such that the front lenses 77, 78 on both the ends thereof are exposed to an external space.

And at this time the position of the lens covers 58a, 58b correspond to the retracted position.

At this retracted position, as better shown in FIG. 11, the outer end of the lens cover 58a on the eyepiece lens sleeve (56a, 56b) side is situated more on an inner side than the outer end of the eyepiece lens sleeves 56a, 56b.

This is because it is possible for the user to, when looking into the lens 78 (see FIG. 10B) in the eyepiece lens sleeves 56a, 56b, avoid his or her forehead's being injured by being hit against the above-mentioned outer end of the lens cover 58a or avoid his or her attention's being disturbed because the outer end is present as an obstacle.

Further, the outer end of the lens cover 58b on the side (objective lens side) opposite to that of the eyepiece lens sleeves 56a, 56b is situated more on the outer side than the opposite lens side.

This is because, when looking into, for example, an object against the light (sun) through this binoculars, it is possible to prevent the emergence of a "ghost" resulting from the light penetrating the body unit (50a, 50b) from the outer lens 77 (see FIG. 9) on the objective lens side.

Further, at the time of rainfall, the above-mentioned binoculars also effectively prevents raindrops being deposited on the outer lens 77 on the objective lens side and avoids the visual field's being disturbed due to the presence of the raindrops.

Even in the second embodiment, when in use, the lens covers 58a, 58b are allowed to be moved from the protective position to the retracted position simply by moving the body units 50a, 50b from the above-mentioned predetermined "not-used" state (first position) to the usable position (second position).

Since the lens covers are moved, under the urging forces of the urging means 70, 70, quickly to the retracted position, it is possible to set the binoculars from the "not-used" state quickly to the usable state.

Further, the lens covers 58a, 58b are surely supported not only in the protective position but also in an intervening period from the protective position to the retracted position and, in spite of being quickly moved from the protective position to the retracted position, never separated from the body units 50a, 50b and are never missing.

In order to move the retracted lens covers 58a, 58b back to the protected position as shown in FIGS. 4A, 4B, 5A, 5B and 6, they are manually moved to the predetermined "not-used" position as shown in FIGS. 4A to 4D and 5A, 5B.

Then, the retracted lens covers 58a, 58b are manually outwardly pulled from the moving guide grooves 63 against the urging forces of the urging means 70, 70.

Then the lens covers 58a, 58b are manually downwardly swung around the pivoting means 62.

And finally the latching projections 72 may be latched to the latching recesses 74 on both the ends of the body units 50a, 50b.

As evident from the above description, according to the present invention, the latching means 71, 71 including the latching projections 72 of the lens covers 58a, 58b and latching recesses 74 on both the ends of the body units 50a, 50b, the inclined surfaces 74a of the latching recesses 74 and the urging means 70, 70 constituting the cover drive means 70, 70 provide a lens cover member control mechanism as will be set out below.

That is, this lens cover member control mechanism is such that, during a period in which the body units 50a, 50b are set to the above-mentioned "not-used" position (first position), the control mechanism latches the lens covers 58a, 58b to the protective position and, by a latch releasing operation in interlock with the movement of the body units 50a, 50b from the above-mentioned "not used" position (first position) to the above-mentioned usable position, moves the lens covers 58a, 58b from the protective position toward the retracted position.

As evident from the detailed explanation above, various kinds of binoculars can be achieved according to the present invention as will be recited from claims below.

As further evident from the detailed explanation above, according to the present invention, it is possible to provide binoculars which, when it is set from the "not-used" state quickly to a usable state, can move lens covers which cover lenses at least on one end of a pair of body units from a protective position readily and quickly to a retracted position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Binoculars comprising:

a pair of body units having a lens, respectively, and relatively movable between a first position in which the body units are not used and a second position in which the body units are usable;

lens cover members so provided as to be movable between a protective position in which, at the fronts of the body units, the lens is not exposed to an outside and a retracted position in which, at the fronts of the body units, the lens is exposed to the outside; and a lens cover member control mechanism which, when the body units are set to the not-used state corresponding to the first position, latches the lens covers to the protective position and, when the body units are moved from the first position to the usable position corresponding to the second position, releases the latching of the lens cover members in interlock with the movement of the body units to move the lens cover members to the retracted position.

2. Binoculars according to claim 1, wherein the lens cover member control mechanism comprises:

a latching mechanism for latching the lens cover members to the protective position when the body units are set to the first position; and a lens cover drive mechanism for moving the lens cover members to the retracted position when the latching of the lens cover members by the latching mechanism is released in interlock with the movement of the body units from the first position to the second position.

3. Binoculars according to claim 2, wherein the latching mechanism comprises an inclined surface provided at the respective body units and a projection provided at the lens cover members and adapted to engage a corresponding portion of the inclined surface.

4. Binoculars according to claim 2, wherein the lens cover drive mechanism has urging means for moving the lens cover members from the protective position toward the retracted position when the latching of the lens cover members by the latching mechanism is released.

5. Binoculars capable of relatively changing positions of a pair of body units having a lens, respectively, comprising:

lens covers movable between a protective position in which, at the fronts of the body units, the lens covers protect the lens exposed to an outside and a retracted position in which the lens covers are retracted from the fronts of the body units; and cover control means for, when the body units are set to a first position, latching the lens covers to the protective position and, when the body units are moved from the first position to a second position, releasing the latching of the lens covers in interlock with this movement to move the lens covers to the retracted position.

6. Binoculars according to claim 5, wherein the cover control means comprising:

latching means for latching the lens covers to the protective position when the body units are set to the first position; and cover drive means for moving the lens covers to the retracted position when the latching of the lens covers is released in interlock with the movement of the body units from the first position to the second position.

7. Binoculars according to claim 6, wherein the latching means comprises an inclined surface provided at the body units; and a projection provided at the lens covers and engaging the corresponding inclined surface.

8. Binoculars according to claim 6, wherein the cover drive means includes urging means for moving the lens covers from the protective position to the retracted position when the latching of the lens covers by the latching means is released.

9. Binoculars comprising:
 a pair of body units so connected as to be relatively movable;
 a lens cover movable between a protective position covering lenses at at least one end of the body units and a retracted position moved from the protective position and exposing the lenses at at least one end of the body units; and
 lens cover retaining means for, when the body units are set to a predetermined not-used position, retaining the lens cover in the protective position and, by a movement of the body units from the predetermined not-used position, allowing a movement of the lens cover from the protective position to the retracted position.

10. Binoculars according to claim 9, further comprising:
 drive means for driving the lens cover from the protective position toward the retracted position by the movement of the body units from the above-mentioned predetermined not-used position.

11. Binoculars according to claim 10, wherein the lens cover retaining means includes a latching member provided in the body units and movable together with the body units and, when the body units are set to the predetermined not-used position, latching the lens cover to retain the lens cover in the protective position and, by the movement of the body units from the predetermined not-used position, releasing the latching of the lens cover to allow a movement of the lens cover from the protective position to the retracted position.

12. Binoculars according to claim 11, wherein the drive means includes urging means for moving the lens cover from the protective position toward the retracted position when the latching of the lens cover by the latching member is released.

13. Binoculars according to claim 9, wherein the lens cover is so provided on the body units as to be movable along the body units between the protective position and the retracted position.

14. Binoculars according to claim 9, wherein the lens cover retaining means includes a latching member provided at at least one end of the body units and movable with at least one end of the body units and, when the body units are set to the predetermined not-used position, latching the lens cover to retain the lens cover to the protective position and, by a movement of the body units from the predetermined not-used position, releasing the latching of the lens cover to allow a movement of the lens cover from the protective position to the retracted position.

15. Binoculars according to claim 14, wherein the latching member of the lens cover retaining means is constituted by a predetermined inclined surface formed at at least one end of the body units.

16. Binoculars according to claim 14, wherein the lens cover is so connected to the body units as to be swingable between the protective position and the retracted position.

17. Binoculars according to claim 16, wherein the lens cover, being in the retracted position, is movable along an outer peripheral surface of the body units.

18. Binoculars according to claim 17, wherein the binoculars includes a bridge-like section so connected as to allow the body units to be swung and the lens cover, being in the retracted position, is set along a bridge-like section.

* * * * *